(No Model.) 7 Sheets—Sheet 2.
W. E. STEARNS.
BUILDING.
No. 495,070. Patented Apr. 11, 1893.
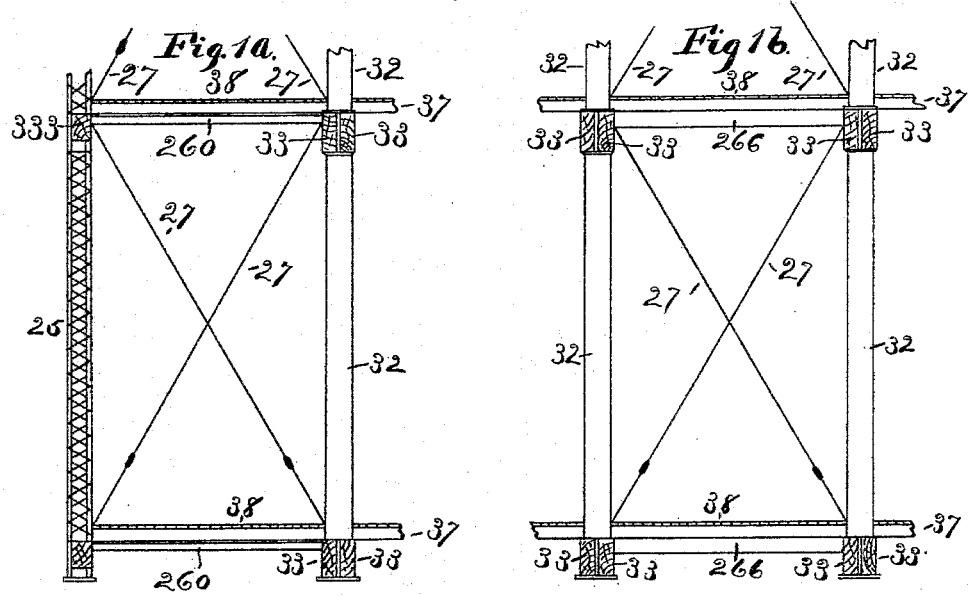
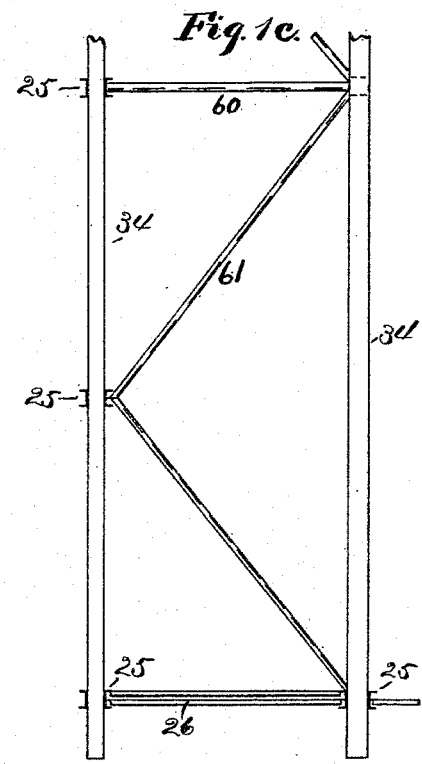
Witnesses.
Edward W. Bush,
George G. Griswold.
Inventor.
William E. Stearns
By James Shepard.
Atty.

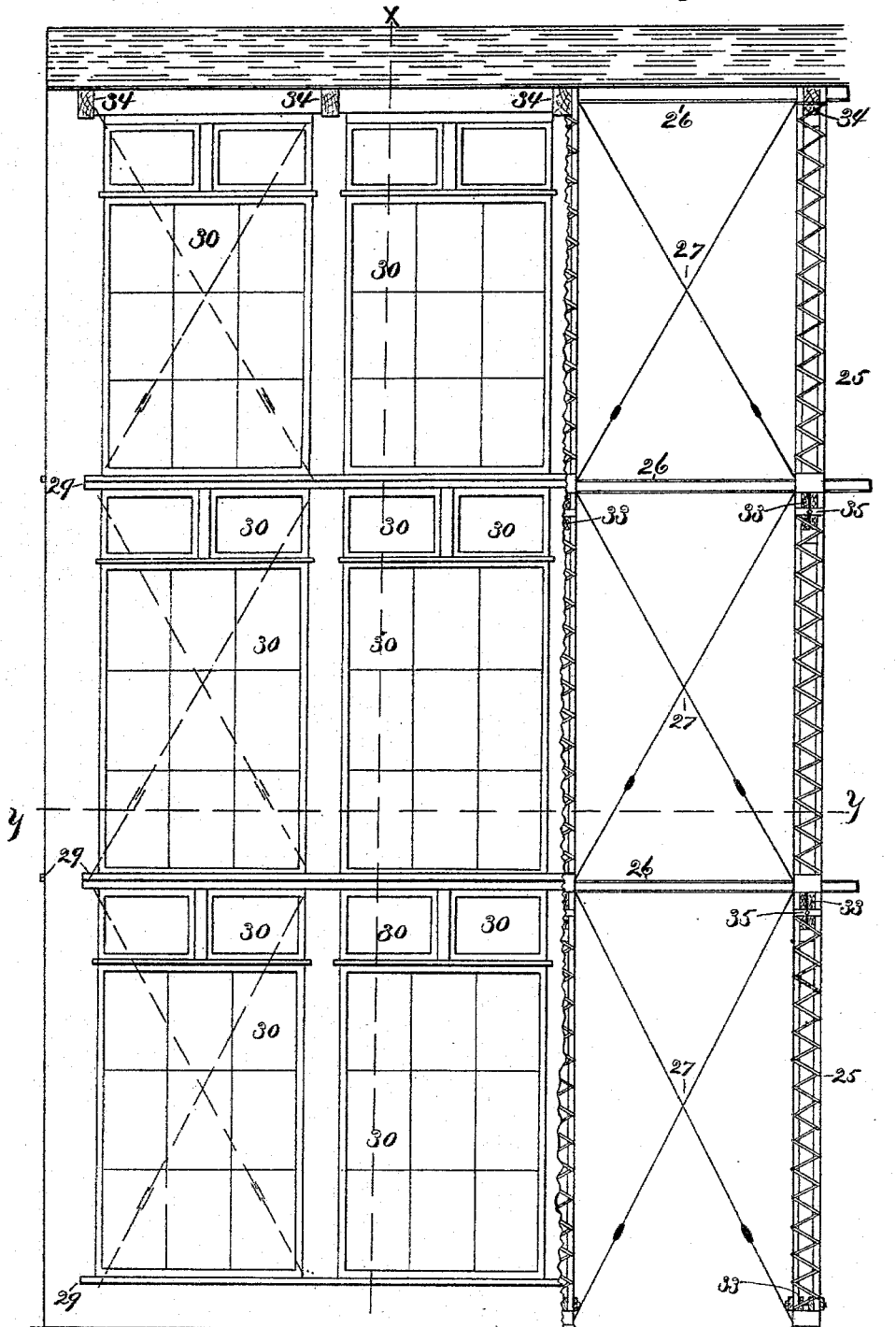

(No Model.) 7 Sheets—Sheet 3.

W. E. STEARNS.
BUILDING.

No. 495,070. Patented Apr. 11, 1893.

Witnesses.
Edward W. Bush.
J. B. Morgan

Inventor.
William E. Stearns,
By James Shepard.
Atty.

(No Model.)  7 Sheets—Sheet 4.

W. E. STEARNS.
BUILDING.

No. 495,070. Patented Apr. 11, 1893.

Witnesses.
Edward W. Bush.
J. B. Morgan.

Inventor.
William E. Stearns,
By James Shepard
Atty.

(No Model.) 7 Sheets—Sheet 5.
W. E. STEARNS.
BUILDING.
No. 495,070. Patented Apr. 11, 1893.
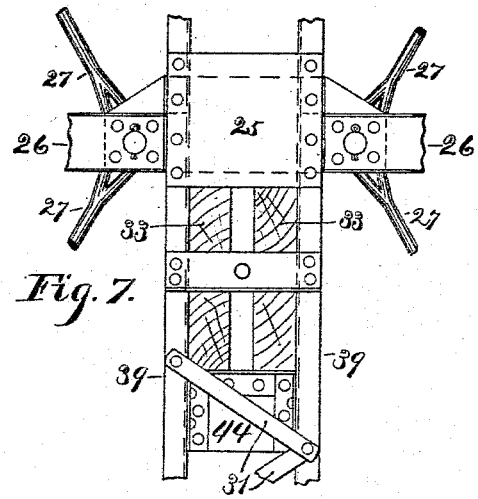
Fig. 7.
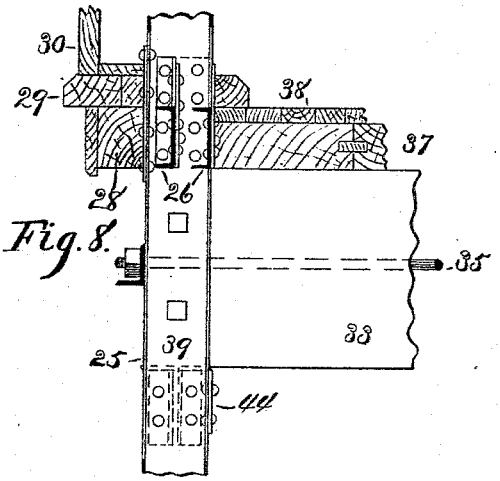
Fig. 8.
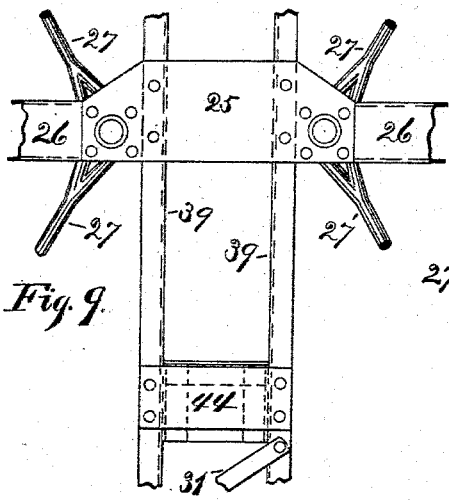
Fig. 9.
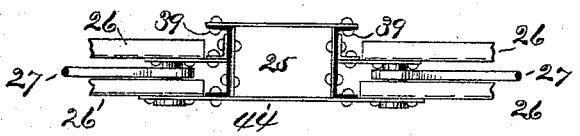
Fig. 10.
Fig. 12.
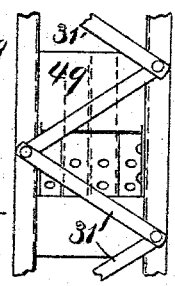
Fig. 11.
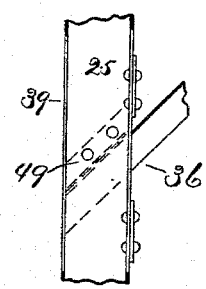
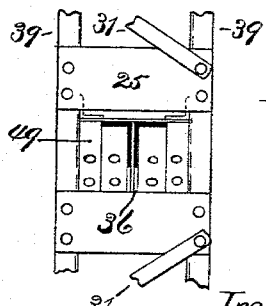
Fig. 13.
Witnesses.
Edward W. Bush,
J. B. Morgan
Inventor.
William E. Stearns
By James Shepard
Atty.

(No Model.) 7 Sheets—Sheet 6.
W. E. STEARNS.
BUILDING.
No. 495,070. Patented Apr. 11, 1893.
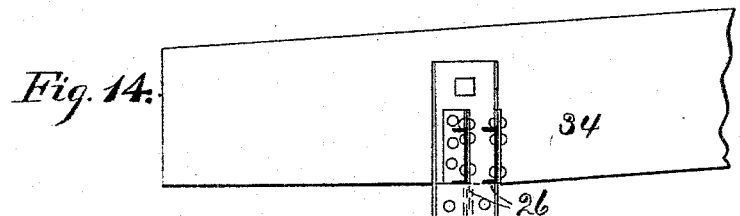
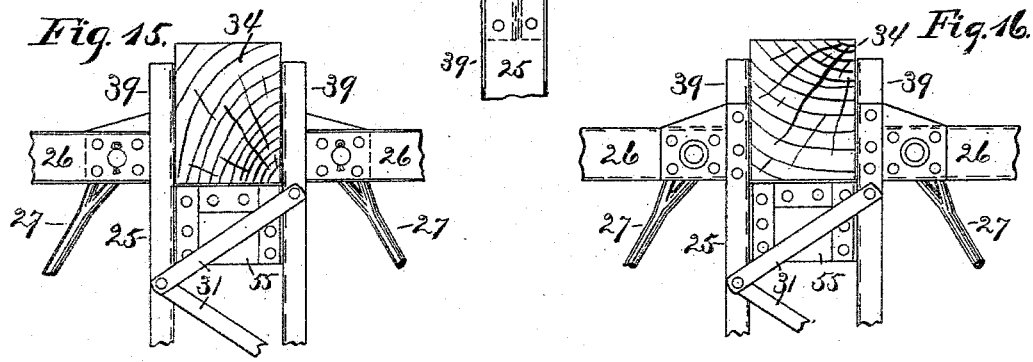
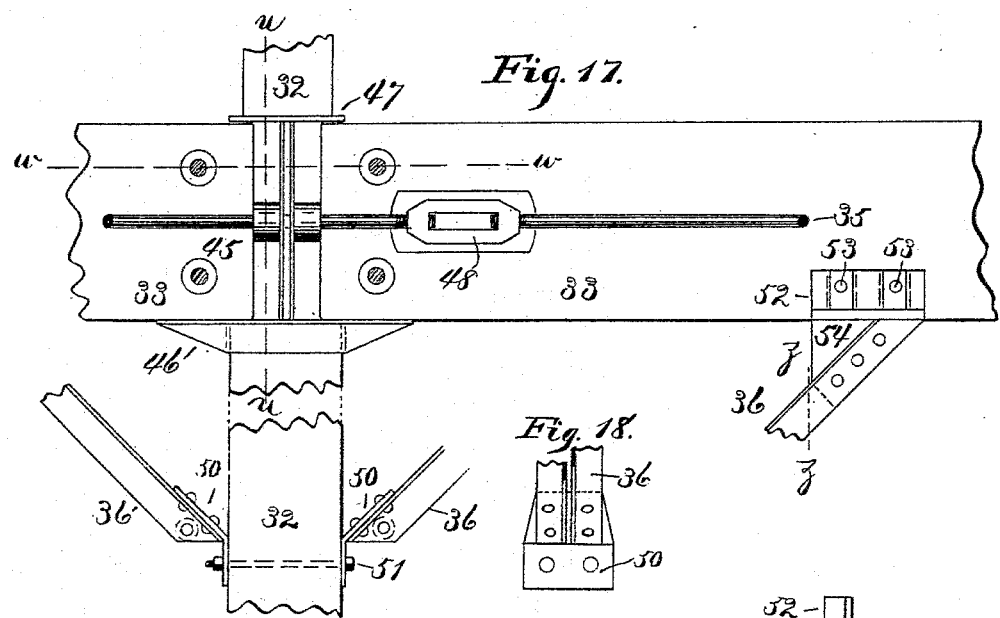
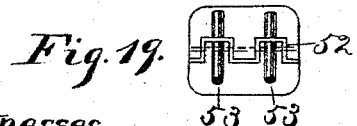
Witnesses.
Edward H. Bush,
J. B. Morgan
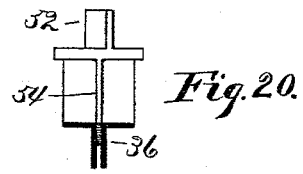
Inventor:
William E. Stearns
By James Shepard.
Atty.
THE NORRIS PETERS CO., PHOTO-LITHO., WASHINGTON, D. C.

(No Model.) 7 Sheets—Sheet 7.

W. E. STEARNS.
BUILDING.

No. 495,070. Patented Apr. 11, 1893.

Witnesses.
Edward W. Bush,
J. B. Morgan.

Inventor.
William E. Stearns,
By James Shepard.
Atty.

UNITED STATES PATENT OFFICE.

WILLIAM E. STEARNS, OF BERLIN, ASSIGNOR TO THE BERLIN IRON BRIDGE COMPANY, OF EAST BERLIN, CONNECTICUT.

BUILDING.

SPECIFICATION forming part of Letters Patent No. 495,070, dated April 11, 1893.

Application filed February 1, 1893. Serial No. 460,532. (No model.)

*To all whom it may concern:*

Be it known that I, WILLIAM E. STEARNS, a citizen of the United States, residing at Berlin, in the county of Hartford and State of Connecticut, have invented certain new and useful Improvements in Buildings, of which the following is a specification.

My invention relates to improvements in buildings for use as cotton or woolen mills or other large buildings; and the main objects of my improvement are to construct a building that shall be well lighted, well braced in every direction, give the greatest floor space when the land to be built upon is limited in area, that can be built more economically and more rapidly, and in all seasons, than is possible in the case of buildings with side and end walls of brick or masonry, and at the same time one that will meet the approval of insurance companies.

Figure 2:
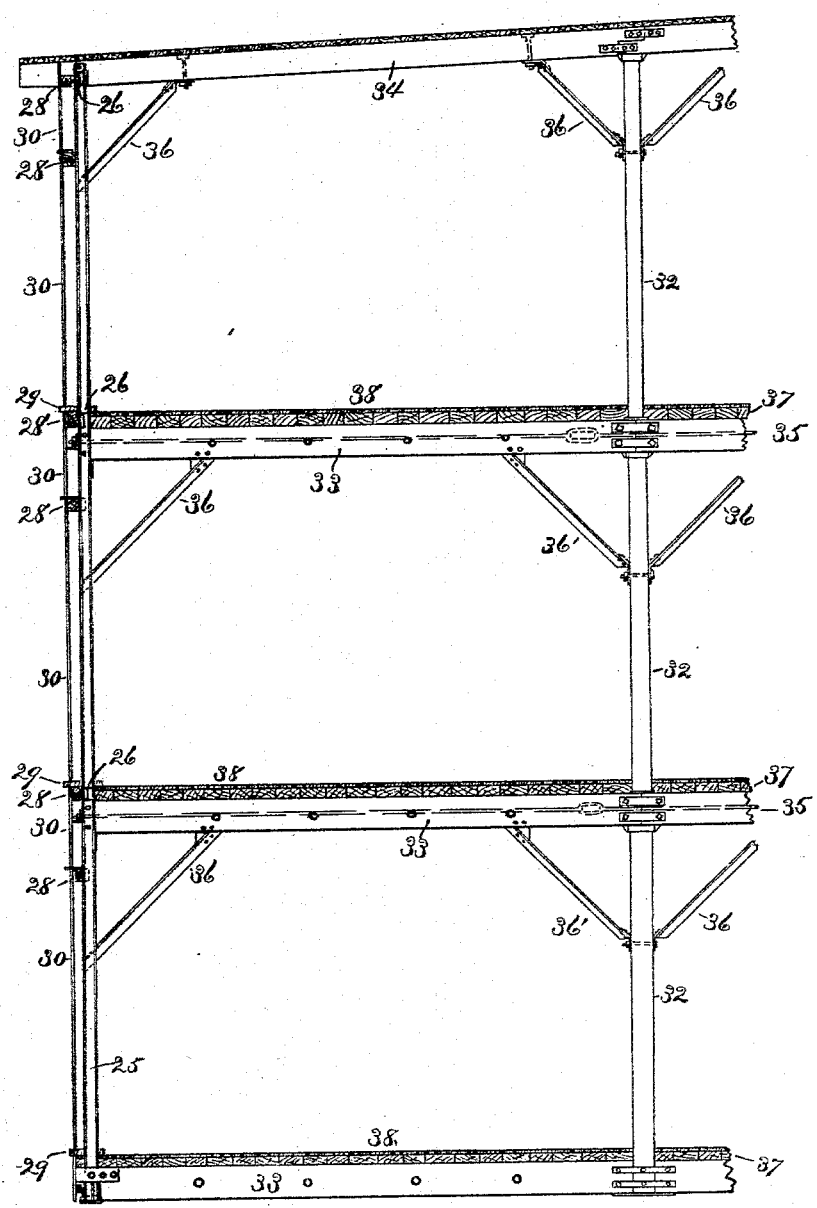
Figure 3:
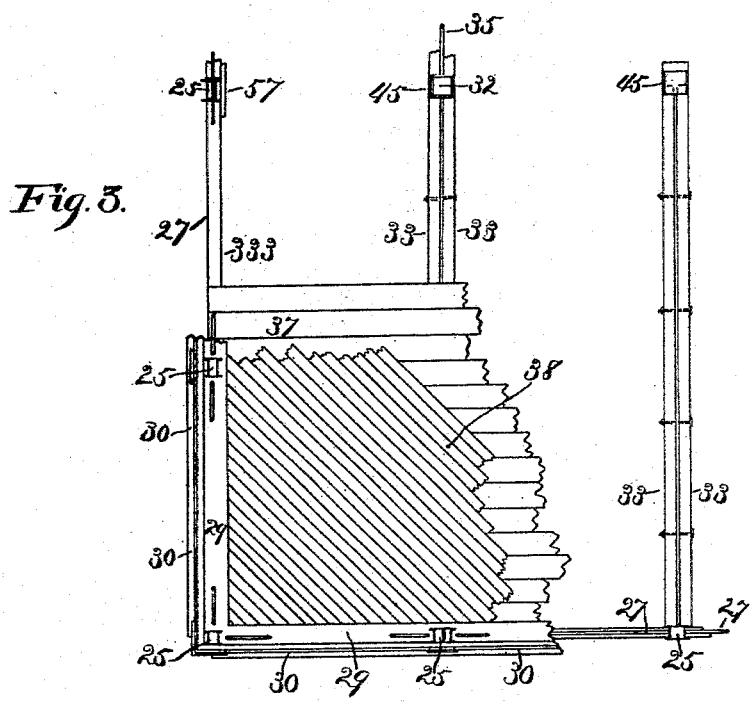
Figure 4:
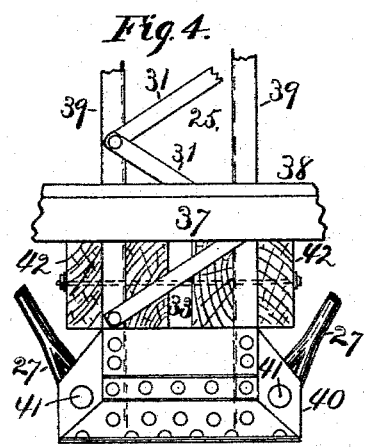
Figure 5:
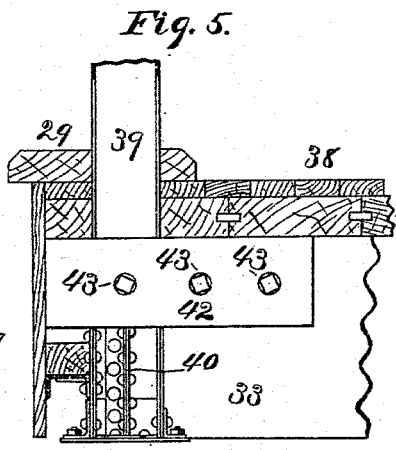
Figure 6:
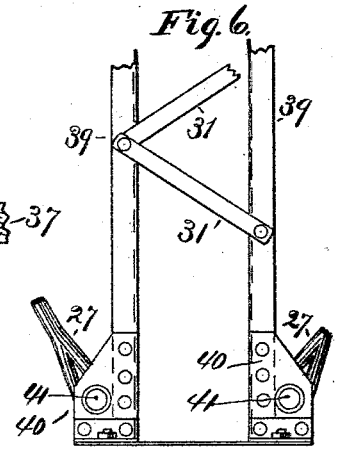
Figure 21:
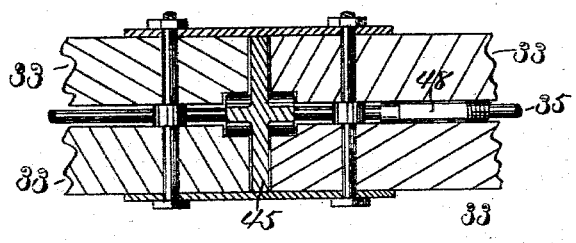
Figure 22:
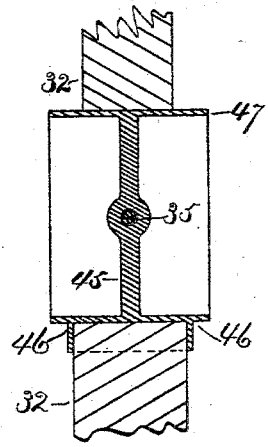
Figure 23:
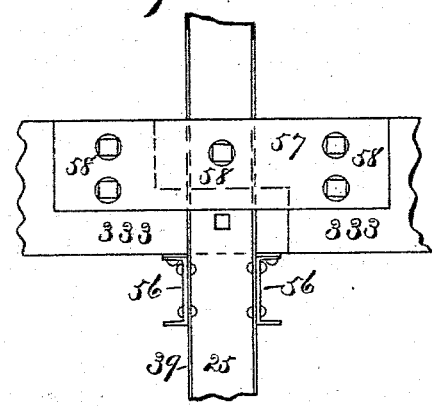
Figure 24:
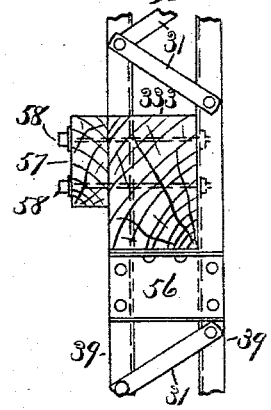

In the accompanying drawings, Figure 1 is an elevation of a portion of my building showing the front or longest side. Fig. 1$^a$ is a longitudinal section of a portion of my building showing one of the vertical posts at the end and one of the inner supporting posts. Fig. 1$^b$ is a like view of another portion showing two of the inner supporting posts. Fig. 1$^c$ is a plan view of a portion at the roof showing one of the end panels. Fig. 2 is a transverse vertical section of a portion of said building. Fig. 3 is a horizontal section of a portion of the same on the line $y$ $y$ of Fig. 1, some of the parts being broken away in order to show parts underneath the same. Fig. 4 is a front elevation at the base of one of the front posts and adjacent parts. Fig. 5 is a side elevation of said post with the flooring and facing boards in section. Fig. 6 is a rear or inside elevation of said posts. Fig. 7 is a front elevation of the posts at one of the upper stories. Fig. 8 is a side elevation of the same with a section of the flooring &c. Fig. 9 is a rear or inside elevation of a portion of the posts shown in Fig. 7. Fig. 10 is a sectional plan view of the same. Fig. 11 is a front elevation of a part of one of the front posts at the connection thereof with the knee brace. Fig. 12 is a side elevation of the same. Fig. 13 is a rear elevation with the knee brace in vertical section. Fig. 14 is a side elevation of one of the front posts at its connection with the rafter. Fig. 15 is a front elevation of the same. Fig. 16 is a rear or inside elevation of the same. Fig. 17 is a side elevation showing the connection of the inner supporting posts with the floor beams, one of the floor beams being removed and the connecting bolts being shown in section. Fig. 18 is an elevation showing the lower end of the knee brace. Fig. 19 is a plan view of the casting for connecting the upper end of the knee brace with the floor beams. Fig. 20 is an end view of said casting with a sectional view of the knee brace on the line $z$ $z$ of Fig. 17. Fig. 21 is a horizontal section of the pintle at the connecting ends of the floor beams, the same being on the line $w$ $w$ of Fig. 17, the connecting bolts being shown in elevation. Fig. 22 is a vertical section of said pintle and supporting post on the line $u$ $u$ of said Fig. 17. Fig. 23 is a side elevation showing the inner side of the end post at the floor connection, and Fig. 24 is a front view of the same with the floor beams in vertical section. Figs. 2 and 3 are on a somewhat smaller scale than Figs. 1, 1$^a$, 1$^b$ and 1$^c$, and all of the views after Fig. 3 are on a larger scale.

My building is specially adapted for construction with a sash covering over substantially the whole of the sides and ends of the building. The particular arrangement of the sash and surrounding facing are not material to my improvement and may be changed as different uses or convenience may require. I form the front and rear or longest sides of the building of vertical iron or steel posts 25 set at suitable distances apart and connected together by horizontal struts and diagonal sway rods 27 between all or part of said posts as may be desired. On the outside of these posts I arrange purlins 28 which are covered with suitable stools 29 upon which to secure the sash 30. The spaces between the sash and above and below it may be covered by any desired finish. The ends of the building may be constructed in substantially the same way. I prefer to form the vertical posts 25 of two channel irons connected together by lattice bars 31. In the interior portion of the building I arrange supporting posts 32 of wood, the same being arranged in line with the front and rear posts and connected therewith by means of floor beams 33 and rafters 34, the floor beams being arranged in pairs with a tie rod 35 between them which extends the whole width of the building to the vertical posts 25. I also provide knee braces 36 connecting said floor beams and inner supporting posts in the interior of the building and the vertical posts at the front and rear. The floor I form of plank 37 extending lengthwise of the building and the flooring 38 extending diagonally thereto. The floor 37 and 38, on the ground floor may extend to the front and rear and answer as a substitute for the bottom purlin.

By the foregoing construction I am enabled to erect a strong and durable building, which is well braced in every direction and firmly tied together, while at the same time the sides and ends are in skeleton form and may be mainly covered by sash so as to more effectively light a very wide building, which cannot be the case when the sides and ends are constructed of brick or masonry walls of the requisite strength.

The above general plan may be somewhat varied in detail, but in order to disclose one form of construction for the same, I will describe in detail the preferred construction of the various parts.

The posts 25, I prefer to construct of two channel irons 39 arranged with their flat faces confronting each other and held at suitable distances apart by lattice bar straps 31. At the base of these posts I secure any suitable foot or finishing piece upon one or both sides of which are the flanges 40, between which the ends of the sway rods 27 may be inserted and secured thereto by bolts or pins 41. The ends of the floor beams 33 may be placed in between the channel irons 39 of the posts and firmly secured at the base by means of wooden strips 42 on each side thereof and bolts 43 extending through said floor beams and strips as shown in the detailed views, Figs. 4 and 5. Upon the floor beams, the planks 37 extend lengthwise of the building and the flooring 38 extends diagonally thereto. In the sides and ends, the floor may be finished by the cap or stool 29 that forms the base on which the sash 30 rests. At the floor for the upper stories I connect the vertical posts by the struts 26 which may be formed of two channel irons. The floor beams 33 are in like manner inserted between the channel irons of the vertical posts with their front and rear ends resting upon the cross tie 44 as shown by the detailed views, Figs. 7, 8, 9 and 10. The wooden supporting posts 32 at the interior of the building are provided with a pintle 45 at the upper stories, said pintle having a flanged base 46 to receive the upper end of the lower post and a flat plate or cap 47 to receive the base of the supporting post for the floor above. The ends of the floor beams 33 rest upon the flanged base and enter in between the vertical flanges of the pintle as best shown in Figs. 17 and 21. The tie rods 35 extend through a hole or eye in the middle of the pintle and lie in between the pairs of floor beams. These tie rods are provided with adjusting nuts or turn buckles 48 for tightening the rods. The tie rods as before specified extend through the building from one of the vertical posts at the front to another vertical post at the rear. The feet of the knee braces 36 are secured to the front and rear posts by means of the inclined cross ties 49, said knee braces being constructed of two angle irons with their horizontal flanges riveted to said inclined cross tie as shown in the detailed views, Figs. 11, 12 and 13. The foot or lower end of these knee braces at the wooden posts may be secured by means of angle plates 50 riveted to the flanges of said brace and secured to said wooden posts by bolts 51 extending through the angle irons of two adjoining braces as shown in the detailed view of Figs. 17 and 18. The upper ends of the knee braces 36 I secure by means of a casting the upper part of which is in the form of a tongue 52 that is adapted to rest in and fill the space between the two floor beams and by which it is secured thereto with pins 53 extending horizontally through said floor beams and casting. The lower part of this casting is provided with a vertical flange 54 to which the angle irons forming the brace 36 are riveted, one upon each side, as shown at the right hand end of the detailed view, Fig. 17 and in Fig. 20. At the upper ends of the posts 25 is a cross tie 55 upon which the ends of the rafters rest, said rafters 34 entering in between the channel irons of said post all as shown in the detailed views, Figs. 14, 15 and 16. The sway rods 27 for the upper stories may be connected with the post by bolts or pins extending through the struts and suitable flanges riveted to said posts.

While the posts for the ends of the building may be substantially the same as for the front and rear or two longest sides, they should be so set as to have the space between their channel irons extend from front to rear. Upon the front and rear sides of these posts, I arrange cross ties or plates 56 upon which to rest a single floor beam 333, the same extending through the space between the channel irons of said post. On the inside of the building at these posts, I place a wooden connecting strip 57 and secure this and said single floor beams firmly together by means of bolts 58 as shown in the detailed views, Figs. 23 and 24. The floor is laid upon these beams in the same manner as upon the double floor beams and finished by a corresponding cap or stool 29. The roof may be braced at its end panels or between any two adjoining rafters by means of struts 60 and diagonal braces 51 as shown in Fig. 1°. The upper ends of the knee braces which connect the vertical iron post and inner wooden post with the rafters may be formed in the same manner as the lower ends of said braces that connect them with the wooden posts 32.

The end panels in the floors for the upper stories may be strengthened by struts and diagonal braces in the same manner as illustrated for the roof in Fig. 1ᶜ. I also brace the inner portion of the building by struts and between pairs of the inner supporting posts or between the end vertical posts and the adjoining inner supporting post. Said struts may be formed of iron as at 260 in Fig. 1ᵃ or of wood as at 266, Fig. 1ᵇ, the sway rods being the same as before described. These sway rods may be placed between as many of the inner supporting posts as may be desired. Sway rods at every fifth pair of posts will ordinarily be sufficient.

I claim as my invention—

1. A building comprising the vertical iron or steel post, the connecting struts, the diagonal sway rods between said posts, the purlins for securing the sash and facing boards, the floor beams extending transversely of the building and arranged in pairs between said vertical posts, the inner supporting posts, the transverse tie rods extending between said pairs of floor beams from post to post and the knee braces at the junction of the posts and floor beams, substantially as described and for the purpose specified.

2. A building comprising the vertical iron or steel posts, the connecting struts, the diagonal sway rods between said posts, the purlins for securing the covering, the floor beams extending transversely of the building, the inner supporting posts, the knee braces at the junction of said posts and floor beams, the tie rods also extending transversely with the building, and the floor consisting of two thicknesses, one of which extends diagonally, substantially as described and for the purpose specified.

3. In a building, the cross frame consisting of front and rear vertical posts, the floor beams arranged in pairs, the inner supporting posts, the tie rods extending between said floor beams from the front to the rear posts and the knee braces in the angles formed by said floor beams and posts, substantially as described and for the purpose specified.

4. In a building the combination of the post 25 formed of two members connected by straps, the cross tie 44 between said members, the floor beams in pairs with their outer ends resting between the two members of said post, the tie rod with its end through said posts and a support for the opposite end of said floor beams and tie rods, substantially as described and for the purpose specified.

5. In a building the combination of the inner supporting posts 32, the flanged pintle between the ends of said posts at the floors for the upper stories, the floor beams in pairs with their ends resting on said pintle and the tie rod between the floor beams extending through an eye in said pintle, substantially as described and for the purpose specified.

WILLIAM E. STEARNS.

Witnesses:
GEO. H. SAGE,
J. H. EDWARDS.